United States Patent [19]

Gresh

[11] 4,066,146
[45] Jan. 3, 1978

[54] RUST RETARDER APPLICATOR

[76] Inventor: Peter P. Gresh, 389 Linwood Drive, Miami Springs, Fla. 33166

[21] Appl. No.: 709,252

[22] Filed: July 28, 1976

[51] Int. Cl.² .............................................. F16N 3/02
[52] U.S. Cl. .............................. 184/1 R; 123/196 R; 184/28; 184/105 A
[58] Field of Search ..................... 184/1 R, 18, 28, 64, 184/105 A; 123/196 R, 196 M, 196 S

[56] References Cited

U.S. PATENT DOCUMENTS

| 1,749,312 | 3/1930 | Blair | 184/28 |
| 2,277,749 | 3/1942 | Eckel et al. | 123/196 M |
| 2,587,060 | 2/1952 | Meyer | 123/196 M |
| 2,591,129 | 4/1952 | Brouwer | 184/1 R |
| 3,416,633 | 12/1968 | Swearingen | 184/1 R |

Primary Examiner—Samuel W. Engle
Assistant Examiner—Ralph Palo

[57] ABSTRACT

A rust retarder applicator which includes a tubular length to be inserted into the combustion chamber of an internal combustion engine when not in use, which is of a cross sectional area adapting the same for insertion through the spark plug opening and which includes a plug slidable therealong which is conical with its lower end being sized for receipt in the spark plug opening and its upper end being sized greater than the cross sectional area of the spark plug opening so that, when the plug is pressed into the spark plug opening, it will be closed, and the upper end of the tubular length including an adapter for connection to an aerosol spray can source of oily material to be sprayed into the combustion cylinder when the spark plug has been removed to weatherproof it.

6 Claims, 2 Drawing Figures

RUST RETARDER APPLICATOR

FIELD OF THE INVENTION

This invention relates to a rust retarder applicator.

BACKGROUND OF THE INVENTION

In the past there have been numerous types of devices which are utilized for weatherproofing a vehicle which is not to be used for a substantial period of time, such as a boat engine, or, indeed, an automobile left at a vacation home, for example. The present invention is of an applicator for applying a rust retarder to the combustion chamber of such an internal combustion engine. It includes a tubular length with a spray head or end which is adapted to be inserted through the spark plug opening and it also includes a plug slidable on the tubular length to close the plug, so that the free end of the tubular length may be connected to an aerosol spray can of oily material and sprayed into the interior of the combustion chamber to weatherproof it so that it will have a coating of oil.

It is, generally, an object of this invention to provide a rust retarder applicator which includes a tubular length with a first spray end and a second end for connection to a source under pressure of oily material or rust retardant and which includes a plug of conical shape slidable along the length between the ends to be positioned in and to stop up a spark plug opening, so that rust retardant or oily material may be inserted into an engine to weatherproof it.

In accordance with these and other objects which will become apparent hereinafter the instant invention will now be described with reference to the accompanying drawing, in which:

DESCRIPTION OF THE PREFERRED EMBODIMENT

Figure 1:
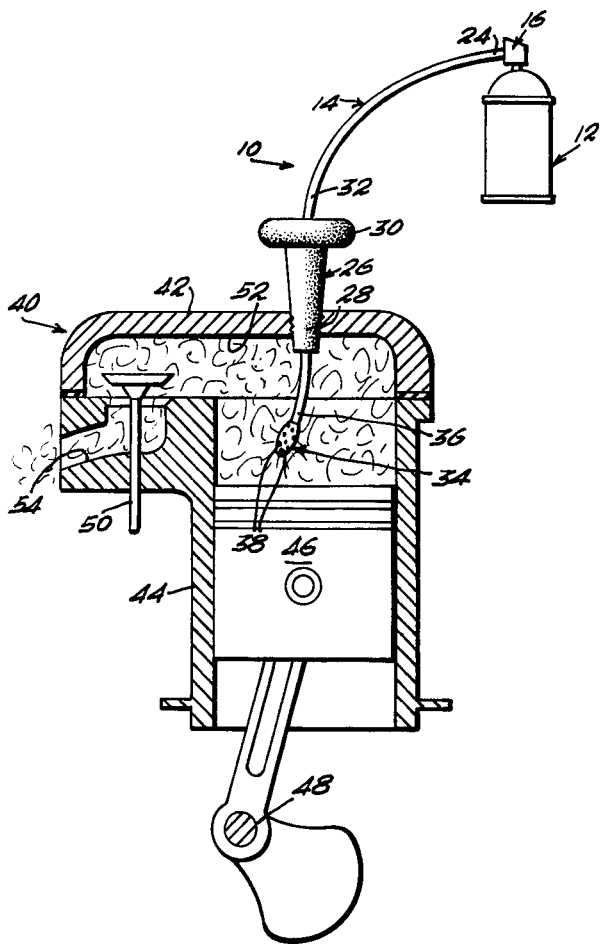
FIG. 1 is a view illustrating the use of the instant invention in relation to an engine which is shown, partly in cross section.
Figure 2:
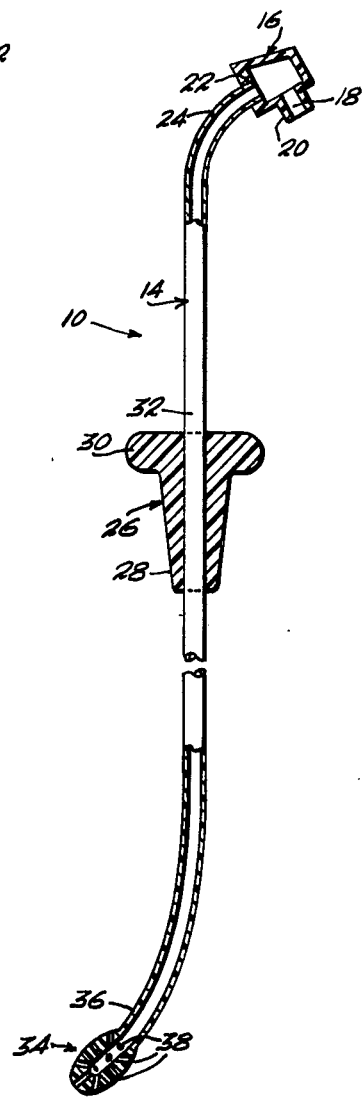
FIG. 2 is a view, partly in cross section, illustrating the instant invention.

Referring to the drawings wherein like reference characters designate like or corresponding parts throughout the several views and referring particularly to FIG. 1, the device is generally designated by the numeral 10. It is adapted to be connected to a source, such as an aerosol spray can of oily material to be sprayed into the interior of an engine to weatherproof it. Generally, the device includes a tubular length 14 which is connected through an adapter 16 to the source. In the preferred embodiment, the adapter is provided with a fitting 20 having a recess 18 sized to mate with a dispensing nozzle, not shown, provided on the source. The upper end 24 of the tubular length 14 is connected to the adapter in fluid communication with the source through a recess 22. Slidably arranged on the tubular length, a plug 26 is provided for a purpose to be described. Preferably, the plug is of relatively hard rubbery material; it is generally conical having a larger upper end 30 and a somewhat smaller lower end 28. Preferably, the larger first end is bulbous at the terminal end to provide a gripping means to facilitate axial movement of the plug relative to the tubular length, as will be explained more fully hereinafter. An axial through bore is provided through the conical plug for sliding movement of it along the intermediate portion 32 of the tubular length between the ends thereof. Preferably, the tubular length terminates at the lower end in an enlarged end zone 34 at the end 36 of the tubular length. Through this end zone there are a plurality of openings 38 arranged to spray a generally radially directed spray of oily material in a spherical pattern.

With reference to the use of the device, and to FIG. 1, it is seen that, when the adapter 16 is connected to the source 12, and oily material under pressure is released, it will travel through the tubular length to be sprayed out of the openings 38 into the cylinder head 52 of the engine 40, when the end is inserted through the spark plug opening in the cover 42. The piston is connected to a crank shaft 48 and captivated by the cylinder wall 44. The valve 50 and the valve passageway 54 play no part in the instant invention; however, they are designated for the purpose of describing the environment of a satisfactory use of the device.

When an engine is not to be used for a substantial period of time, it is wise to weatherproof it. This may be done by removing the spark plug from each of the cyliners of the engine, inserting the dispensing end of the tube to the proper depth, advancing the plug until it is pressed into the spark plug opening whereupon oily material is sprayed into the interior. Then, the device is removed and the spark plug may be reinserted into the engine. In the preferred embodiment, the dispensing end 34 of the tubular length may be a separate member which is attached to the end of the hose or, it may be integral with it. In the preferred embodiment, the upper end zone 24 is secured in the opening or recess 22 in a snug tight fit; however, if desired, adhesive materials may be used. Generally speaking, the device includes a tubular length having an adapter connected to one end to mate with an oil supply under pressure and a dispensing end and a plug slidably movable along the tubular length which by its location determines the length of penetration of the dispensing end within the cylinder head and which plug closes the cylinder head so that the oil which is sprayed therein will coat the interior of the cylinder head.

What is claimed is:

1. For use in applying oil in the cylinder head of an engine above a piston and through a spark plug opening, a dispensing device for use with a pressurized source of oil having a dispensing opening, said device comprising:

A. a tubular length having a through passageway and having a first end zone and a second end zone, said length being of a cross sectional area which is uniform between the end zones, said second end zone having a plurality of circumferentially facing equal size openings in open communication with the passageway through the tubular length, and said second end zone being sized for receipt through said spark plug opening, B. a generally conical plug having an axial through bore sized for sliding receipt of said tubular length and adapted for sliding movement along said tubular length, said plug having an enlarged first end and a smaller second end, said smaller end facing said second end of said tubular length and said second end being of a cross sectional area less than the cross sectional area of the spark plug opening for receipt therein, said plug being of yieldable rubber material for inserting it into the spark plug opening, C. an adapter having a first opening and a second opening, said adapter including means to secure to the first end of the tubular length and the first opening being in fluid communication with the passageway through the tube and said second opening being sized for engagement with said pressurized source.

2. The device as set forth in claim 1 wherein said second end zone of said tubular length is enlarged with respect to said first end zone.

3. The device as set forth in claim 2 wherein said first opening of said adapter comprises a recess and said first end of said tubular length is sized for receipt in said recess in a snug fit.

4. The device as set forth in claim 3 wherein said conical plug includes gripping means on the enlarged first end.

5. The device as set forth in claim 4 wherein said adapter includes an operator surface.

6. The device as set forth in claim 5 wherein said device includes, in combination, a pressurized source of oil, comprising an aerosol spray can having an operator with a nozzle, and said second opening of said adapter comprising a recess sized to nest about the nozzle of said aerosol spray can and said adapter is adapted to be depressed to release pressurized oil from the aerosol can.

* * * * *